March 25, 1941.    A. C. KOWALSKI    2,236,373

METHOD OF PERMANENTLY RECORDING DEFECTS IN METALS

Filed July 5, 1940

Inventor:
Anthony C. Kowalski
by attorney
Charles R. Fay

Patented Mar. 25, 1941

2,236,373

UNITED STATES PATENT OFFICE 2,236,373

METHOD OF PERMANENTLY RECORDING DEFECTS IN METALS

Anthony C. Kowalski, Worcester, Mass.

Application July 5, 1940, Serial No. 344,071

6 Claims. (Cl. 234—1)

This invention relates to the art of recording defects, especially those appearing in steel or iron members, and to a method of making a single, or a plurality of, permanent records showing the location, size, etc., of any defects in the specimen.

Objects of the invention include the provision of a method by which permanent records of tested steel pieces may be made; the provision of a method of permanently recording the results of a magnetic inspection of a steel or iron test piece; and the provision of a method of permanently recording the results of a magnetic inspection test by the use of paramagnetic particles which visually indicate the defects and which also form the permanent record.

Other objects and advantages of the invention will appear hereinafter.

Reference is to be had to the accompanying drawing, in which

Figure 1:
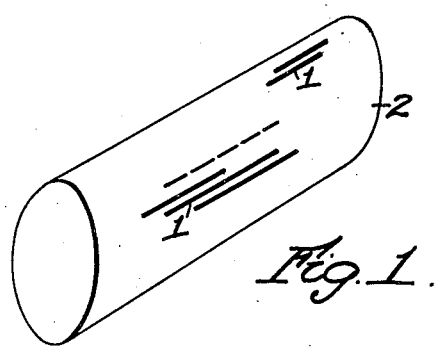
Fig. 1 represents a test piece already tested and having magnetic particles clinging thereto in the outline of the defects.
Figure 2:
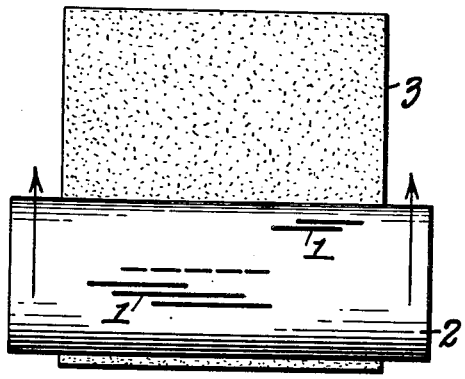
Fig. 2 illustrates a form of transferring some of the particles to a sheet.
Figure 3:
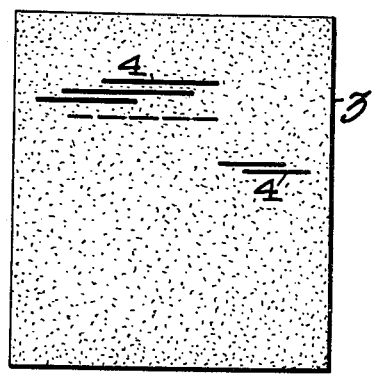
Fig. 3 shows the sheet after the transfer.

In order to best describe the present invention, it is thought best to explain what is meant by "magnetic inspection" of steel or iron. By magnetic inspection, I mean the method applied by application of magnetic forces and paramagnetic particles for the detection of cracks, discontinuities of metals, both surface and subsurface, and other defects in magnetic material. The paramagnetic particles used as a visual medium in this method of inspection have much greater permeance and conduct the lines of force better than air.

A simple illustration as to how this method of inspection functions may be shown by a bar magnet which has lines of force passing thru it forming a magnetic circuit and which also contains any defect such as a crack. Each line of force tries to make a complete and unbroken, continuous path, or circuit, and thus follows the line of least resistance by using the paramagnetic substance as a bridge over the defect. The complete course taken by the lines of magnetic force within and without the magnet comprises the magnetic circuit of that magnet. This is the means used by the process of magnetic inspection.

If I have a magnetic test part which I wish to inspect by this method, I cause the part to be electrically energized, thus forming a magnetic circuit, and at the same time I use a paramagnetic substance to cover the entire surface of the part. If a defect is present in the part, it immediately sets up a polarity and the paramagnetic substance forms a bridge across the defect which allows the magnetic circuit to be completed with least resistance. This "bridge" or line of paramagnetic substance, which adheres to the test part, can be seen by visual inspection, may indicate a surface defect which is extremely small.

When a piece of magnetic material has been subjected to the magnetic test, as above stated, paramagnetic particles align themselves over any and all defects on the surface of the material and over defects on the subsurface of the material to a depth dependent on the intensity of the current used in magnetizing the material. The size of the paramagnetic deposit superimposed over the defect is considerably larger than the size of the defect itself.

The present advance in the art deals with the making of a permanent record of the size, shape, and location of the paramagnetic deposit on the magnetized material. My method consists of transferring some of the adhering and massed paramagnetic particles 1 from the magnetized part 2 to a piece of paper 3 or other suitable permanent material which has been prepared to be capable of retaining the paramagnetic particles. Since non-magnetic materials may also be subjected to a magnetic test showing defects, this method would be applicable in its case as well. The most successful method of recording through this invention has been found to be as follows: After the material to be tested has been subjected to the test, it is allowed to dry. The specimen should be cylindrical (for ease of manipulation) and highly polished in order that the minutest defects may be revealed. The best recording medium is "imbibition" paper (sold by the Eastman Kodak Company under that name). This paper is covered by an emulsion (probably gelatinous) which is not affected by light and which is quite hard when dry but when moistened is rather tacky.

The "imbibition" paper is moistened to render it tacky, and the dry specimen or test part, being cylindrical, may be rolled over the surface of the paper. The paramagnetic particles, coming in contact with the tacky surface of the paper, are taken off thereby and become imbedded therein, as at 4 so that one revolution of the test part in contact with the paper will leave a perfect impression of the actual defect-showing particles on the paper. That is, the paper will show a reproduction of the entire surface of the test part as far as the particles are concerned, and thus the effect is that of shaving off the surface of the test part and laying it flat.

Figure 4:
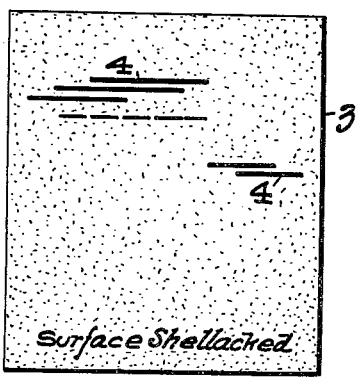
Fig. 4 represents the sheet with the particles attached in the form of the defects and coated.

After this step, the paper may be coated with shellac or other like substance, as represented in Fig. 4, which hardens over the recording, and this of course produces a permanent record which is not spoiled by handling, and which may be used as a future reference to the test part. In the absence of the coating, the particles could be rubbed off the paper, as they are held merely by a mechanical bond in the tacky surface.

The above stated method is preferred, but the essential steps may be varied in many ways. The paper could be wrapped around the specimen to receive the particles, and any tacky-surfaced paper may be used to retain the paramagnetic particles. Even light-sensitive paper could be used, but this necessitates the further step of using a solution to kill the light effect. It has been found that a white paper is best, as the paramagnetic material is black, and this makes for contrast and easy reading of the record.

One important effect which flows from this method is that only the outermost particles are transferred to the tacky sheet, and therefore a plurality of records can be made with only one magnetization. Of course, innumerable records could be made merely by remagnetization and repeating the process.

This invention provides for permanent records of test pieces, which may be studied as to number and concentration of particles, and thus a set of standards for steel classifications could easily be made, especially as to use for different purposes. Also, the test and the recording could be done even after fabrication into parts, and of course, no destructive consequences result from the use of my invention.

Having thus described my invention and the advantages thereof, I do not wish to be limited to the details herein disclosed, otherwise than as set forth in the claims, but what I claim is:

1. As a method of making a permanent record of a defect test for metals, the steps of causing magnetic particles to cling to a test part where defects occur, and transferring at least some of the particles to a prepared medium in the same order in which they appear on the test part.

2. As a method of producing a permanent record of a defect test, the steps of causing particles to cling to a test piece so that they will be grouped upon the test piece to indicate the defects, and transferring at least some of said particles from the test piece to a sheet having a prepared tacky surface, to which said particles will adhere.

3. As a method of producing a permanent record of defects in a metal test piece, the steps of grouping a plurality of paramagnetic particles on the test piece in proportion to the size of the defects, and applying a sheet having a tacky surface to said grouped particles, so that the outermost particles will adhere to said surface.

4. As a method of producing a permanent record of defects in a metallic cylindrical test piece, the steps of causing fine particles to cling to said piece, providing a sheet having a tacky surface, and rolling the piece over the sheet so that at least some of the adhered particles will cling to the tacky surface in the order in which they appear on the piece.

5. The method of producing a permanent record of a defect test of a work piece, in which the test per se has previously caused particles to cling to the piece to show defects, which comprises transferring at least some particles wherever they appear to a tacky sheet, in such a manner that said particles will cling to said sheet in the order they appeared on the work piece.

6. The method of producing a permanent record of a defect test as recited in claim 5 wherein the work piece is pressed to the sheet thereby transferring the particles.

ANTHONY C. KOWALSKI.